United States Patent [19]

Fujisaki

[11] Patent Number: 4,574,214

[45] Date of Patent: Mar. 4, 1986

[54] ELECTRIC ROTARY DEVICE OF PERMANENT MAGNET TYPE

[76] Inventor: Kiyonori Fujisaki, 195-4 Ooyaguchi, Matsudo-shi, Chiba-ken, Japan

[21] Appl. No.: 659,858

[22] Filed: Oct. 11, 1984

Related U.S. Application Data

[63] Continuation of Ser. No. 417,909, Sep. 14, 1982, abandoned.

[30] Foreign Application Priority Data

Sep. 24, 1981 [JP] Japan ............................ 56-141837[U]

[51] Int. Cl.$^4$ ............................................ H02K 21/26
[52] U.S. Cl. .................................................... 310/154
[58] Field of Search ................ 310/152, 184, 154, 254

[56] References Cited

U.S. PATENT DOCUMENTS 4,091,300  5/1978  Lynch et al. ........................ 310/154
4,110,645  8/1978  Hendershot, Jr. ................... 310/154
4,110,718  8/1978  Odor et al. ....................... 310/154.6
4,237,397 12/1980  Mohr et al. ........................ 310/154

FOREIGN PATENT DOCUMENTS 1277876  6/1972  United Kingdom .

Primary Examiner—Donovan F. Duggan
Attorney, Agent, or Firm—Ziems, Walter & Shannon

[57]  ABSTRACT

An electric rotary device of permanent magnet type has a stator including a plurality of permanent magnets and a rotor rotatably mounted within the stator and including an armature core and a plurality of windings wound around the armature core, said permanent magnets each having an axial length in the direction of the central rotation axis of the rotor, said axial length being a maximum at the center of the permanent magnet and progressively reduced towards both side ends of the permanent magnet.

8 Claims, 11 Drawing Figures

ELECTRIC ROTARY DEVICE OF PERMANENT MAGNET TYPE

This application is a continuation, of application Ser. No. 417,909, filed Sept. 14, 1982, now abandoned.

BACKGROUND OF THE INVENTION

The invention relates to an electric rotary device of permanent magnet type, and more particularly relates to an improvement in the magnetic field structure of the electric rotary device of permanent magnet type such as an electric motor or an electric generator.

For convenience sake, FIGS. 1-4 are provided to explain the prior art in the field of the invention, in which a well known electric motor M is shown. The electric motor M is generally composed of a stator 1 and a rotor 2 which is rotatably mounted within the stator 1. The stator 1 consists of a cylindrical case 3 and a pair of permanent magnets 4,4 arranged opposite to each other and secured to the inner face of the case 3. The rotor 2 consists of an armature core 6 secured to the central rotation shaft 5 and a plurality of windings 7 wound around the arms 6b of the armature core 6. Thus the rotor 2 is rotated on the axis X-X in the direction R with the electric current flowing the armature windings 7.

According to the abovementioned old electric motor M, the permanent magnets 4,4 are each semicircular in the transverse section as shown in FIG. 2 and arranged around the central rotation shaft 5 with a configuration to be rectangular in the front elevational projection as shown in FIG. 3. It is therefore apparent that the magnetic flux of permanent magnets 4,4 is evenly distributed with respect to the rotating direction R of rotor 2. On the other hand, the distribution of the magnetic flux will abruptly change between the permanent magnets 4,4 during rotation of the rotor 2. As the result, the rotor 2 is shocked during each distribution of magnetic flux change, and is accordingly prevented from attaining a stabilized smooth rotation. It is apparent that such a property of the motor will have an adverse influence, for example, on a tape recorder which requires a high rotational precision for producing a natural phonetic sound.

In in order to eliminate the abovementioned defect of the electric motor, it has been proposed in the prior art to modify each of the front faces 6a of the armature core 6 into a parallelogramic shape in such a manner that a predetermined axial portion w of each face 6a may be varied in the rotating direction R of rotor 2, and then to wind each winding 7 around the armature core 6 in accordance to the parallelogramic shape of the face 6a as shown in FIG. 4.

In this case, however, it has been generally observed that the whole configuration of armature core 6 is considerably complicated and accordingly, it is difficult to produce such an armature core. As the result, the production of armature core 6 is deteriorated with an additional increase of production cost.

The present invention has been provided to eliminate the abovementioned defect of the prior art. It is therefore a primary object of the invention to smoothly vary the distribution of magnetic flux during rotation of the rotor of electric motor or electric generator to thereby operate the same in a smooth and stabilized condition without any rotational shocks due to the abrupt distribution change of magnetic flux.

It is another aspect of the invention to provide a new electric rotary device of permanent magnetic type attaining the abovementioned object with a simple structure adapted for mass production of the device.

DETAILED DESCRIPTION OF THE INVENTION

Figure 1:
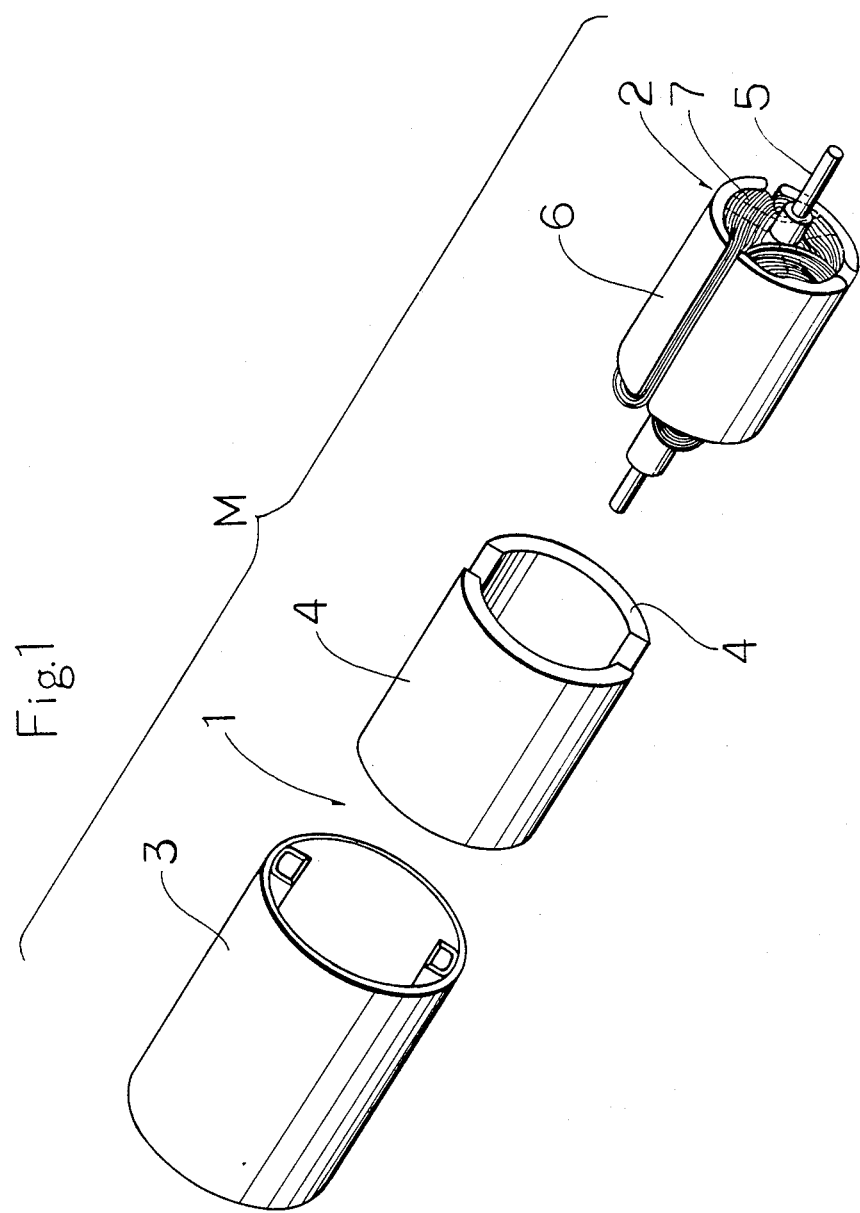
FIG. 1 is an exploded perspective view of a conventional electric motor.
Figure 2:
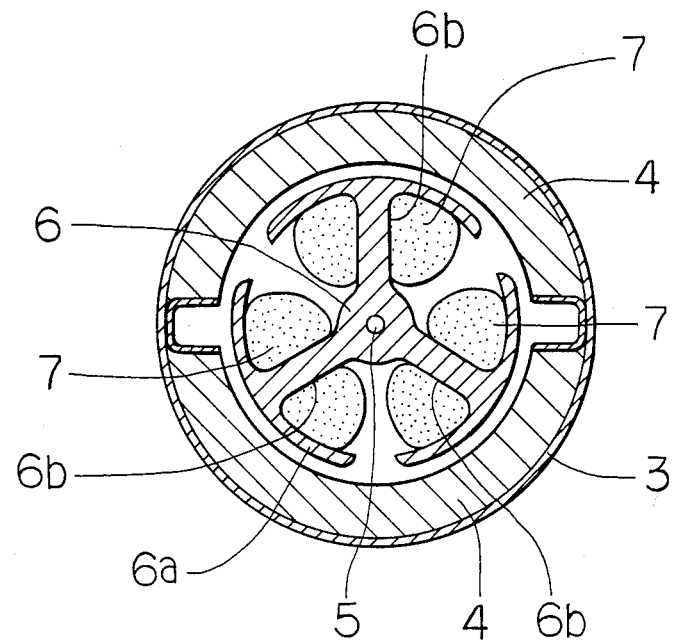
FIG. 2 is a transverse sectional view of the abovementioned electric motor.
Figure 3:
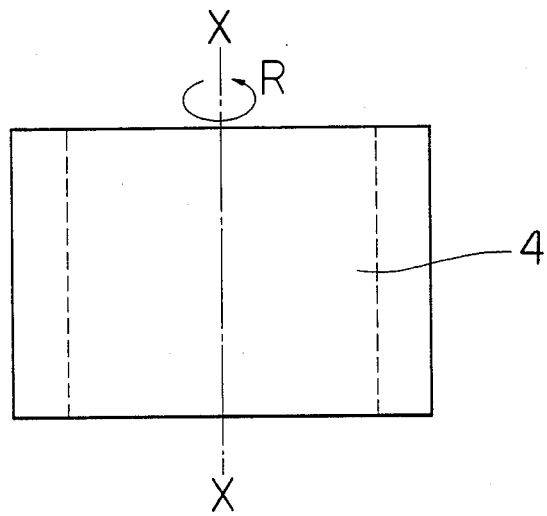
FIG. 3 is a front elevational view of a permanent magnet used in the abovementioned electric motor.
Figure 4:
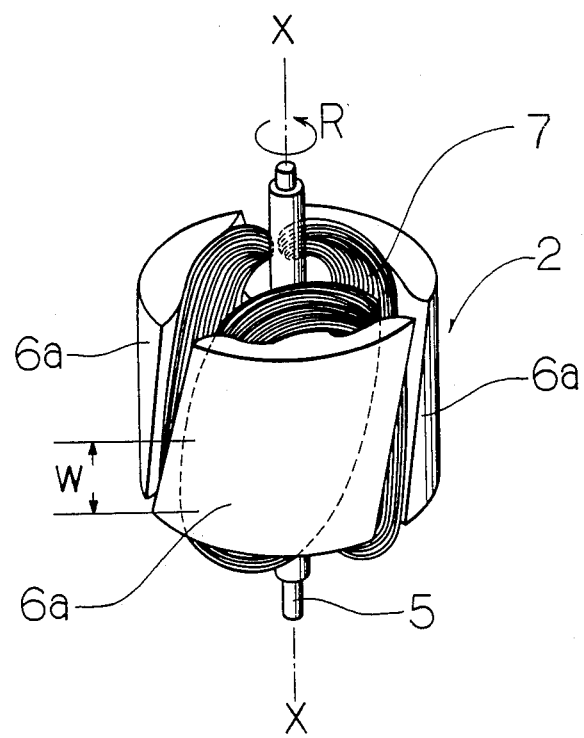
FIG. 4 is a perspective view of a rotor used in the abovementioned electric motor.
Figure 5:
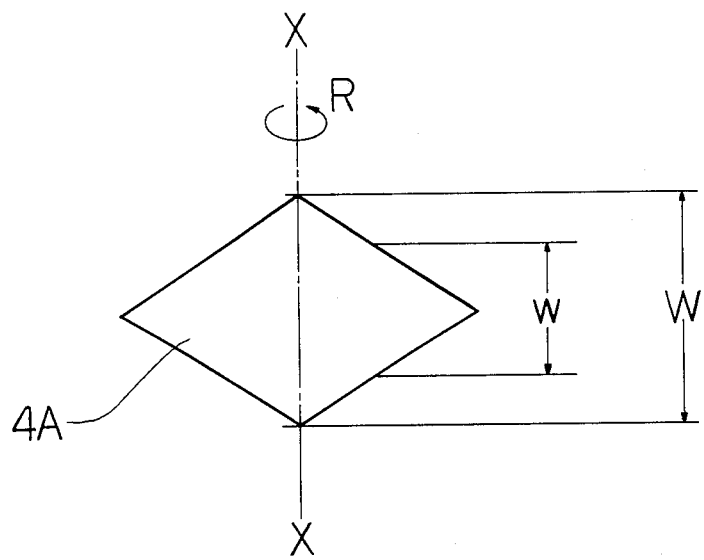
FIG. 5 is a front elevational view of a permanent magnet according to the invention.
Figure 6:
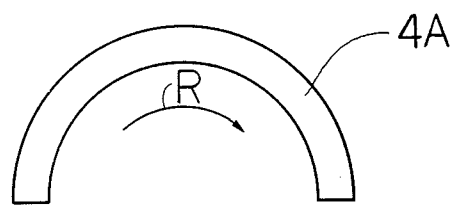
FIG. 6 is an end elevation of the permanent magnet as shown in FIG. 5.

The invention will now be described in reference to the embodiments as shown in the attached drawings. In reference to FIGS. 1-4, and FIGS. 5 and 6, a permanent magnet 4A is an embodiment according to the invention to be employed as a part of stator 1 in place of the permanent element 4 of the electric motor M. As shown, the permanent magnet 4A is semicircular in the transverse section thereof and has an axial length dimension, or vertical width, W along or in the direction of the axis x-x of the central rotation shaft 5 of rotor 2. As shown in FIG. 5, the axial length dimension W in the direction of the axis X-X is a maximum at the center of the permanent magnet 4A and is gradually reduced towards both side ends of the magnet 4A from the central vertical axis X-X. More precisely, the permanent magnet 4A has a shape of diamond with the axial length dimension W being a maximum at the center thereof and which the axial length dimension is gradually reduced along a straight line in a linear manner to a minimum of zero through an intermediate medium width w on both side ends.

In view of the permanent magnet 4A having a shape of diamond and employed in a pair as a part of the stator 1, it is apparent that the distribution of magnetic flux will be gradually varied in proportion to the variation of the axial length of the permanent magnet 4A, and accordingly the rotor 2 will receive little shock during rotation thereof to such an extent that the rotor 2 performs a smooth and stabilized rotation in the electric motor M.

Figure 7:
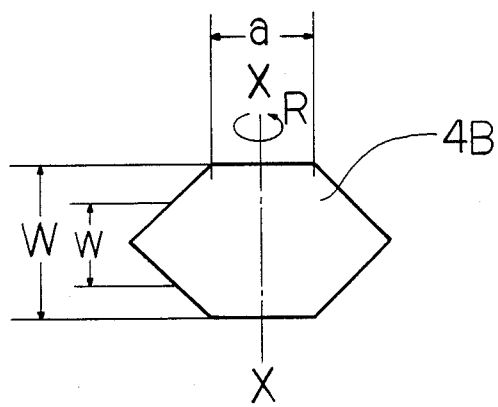
FIGS. 7-11 are front elevational views showing other different embodiments of permanent magnet according to the invention.

FIG. 7 shows a permanent magnet 4B of another embodiment according to the invention. As shown, the permanent magnet 4B has a carapace shape with an axial length dimension W that is a maximum in the central transverse portion a. As shown the axial length dimension W is gradually reduced from a maximum along a straight line to a minimum zero through an intermediate medium width w on both side ends thereof.

Figure 8:
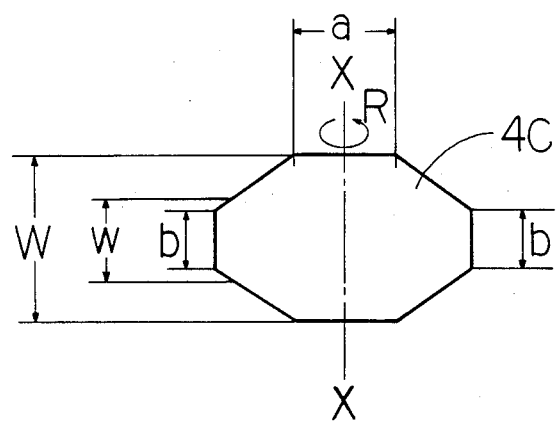

FIG. 8 shows a permanent magnet 4C of another embodiment according to the invention. As shown, the permament magnet 4C has an octagonal shape with an axial length dimension W that is a maximum W in the central transverse portion a. As shown the axial length dimension W is gradually reduced, from a maximum at the center, along a straight line to a minimum b through an intermediate medium width w on both side ends of the magnet 4C.

Figure 9:
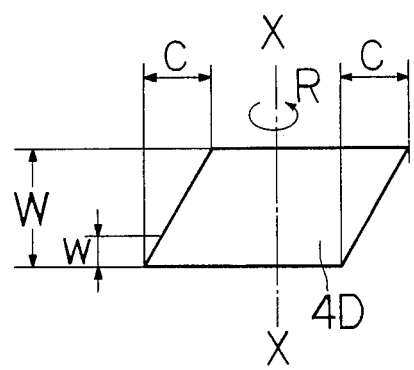

FIG. 9 shows a permanent magnet 4D of still another embodiment according to the invention. As shown, the permanent magnet 4D has a parallelogramic shape with an axial length dimension W which is a maximum at the center and which is gradually reduced in the transverse portion c along a straight line to a minimum zero through the intermediate medium width w on both side ends of the magnet 4D.

Figure 10:
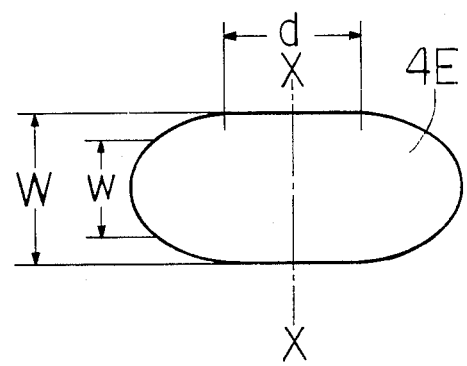

FIG. 10 shows a permanent 4E of still another embodiment according to the invention. As shown, the permanent magnet 4E has a shape of laterally elongated circle with an axial length dimension W along the central axis X-X in the central transverse portion d. The axial length dimension W is a maximum at the center and is gradually reduced to a minimum zero along an arcuate line through an intermediate medium width w on both side ends of the magnet 4E.

Figure 11:
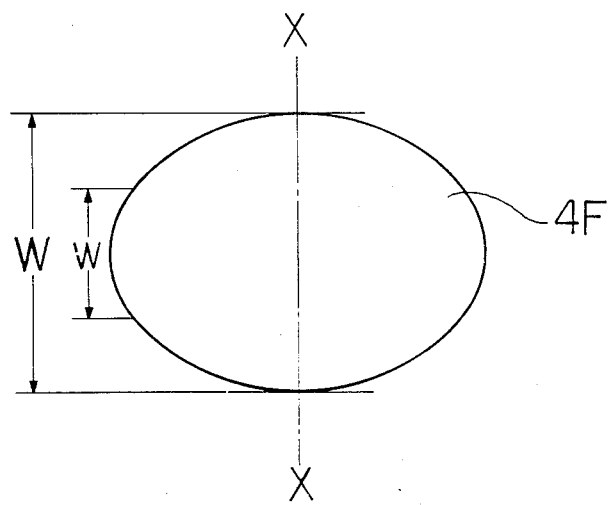

FIG. 11 shows a permanent magnet 4F of still another embodiment according to the invention. As shown, the permanent magnet 4F has an egg like shape with an axial length dimension W that is a maximum at the center along the central axis x-x. The axial length dimension W is gradually reduced from its maximum to a minimum on both side ends of the magnet 4F through an intermediate medium width w along a curved line.

Other modifications of permanent magnet may be possible without departing from the spirit of the invention. In short, any permanent magnet will do if it has a shape in the front elevation with a maximum vertical width at the central part thereof which is gradually reduced towards both side ends thereof.

The invention has been described in reference to a permanent magnet as a part of stator for an electric motor. It is however apparent that the invention may be applied to the permanent magnet as a part of stator for an electric generator.

With the permanent magnet of such a configuration, the electric motor or the electric generator will have an effect that the distribution of magnetic flux will progressively and smoothly vary in the rotational direction of rotor. Accordingly the rotor will be rotated in a smooth and stabilized condition free from a shock due to the abrupt change of distribution of magnetic flux.

It is therefore practically useful to employ an electric motor of the invention in an device such as a tape recorder which requires a rotational precision for producing a natural phonetic sound because the motor is free from the shocks due to the abrupt variation of magnetic flux distribution which may otherwise give an adverse influence to the sound production of the tape recorder.

What we claim is:

1. An electric rotary device of permanent magnet type comprising:
    a stator including a plurality of permanent magnets and a rotor mounted within the stator for rotation about a central axis, said rotor including an armature core and a plurality of windings wound around said armature core, said permanent magnets each having an axial length dimension at the center thereof along the central axis of rotation, the axial length dimension along the central axis being a maximum at the center of each permanent magnet and being progressively reduced toward both side ends of each permanent magnet.

2. The electric rotary device of claim 1, wherein said axial length dimension is progressively reduced from a maximum at the center of each permanent magnet to a minimum at both side ends thereof.

3. The electric rotary device of claim 1, wherein said axial length dimension is progressively reduced from a maximum at the center of each permanent magnet to a minimum at both side ends thereof, the minimum being greater than zero.

4. The electric rotary device of claim 1, wherein said axial length dimension is progressively reduced along a straight line path from a maximum at the center of each permanent magnet to a minimum at each side end thereof.

5. The electric rotary device of claim 1, wherein said axial length dimension is progressively reduced along an arcuate path from a maximum at the center of each permanent magnet to a minimum at each side end thereof.

6. An electric rotary device of permanent magnet type comprising:
    a stator including a plurality of permanent magnets and a rotor mounted within the stator for rotation about a central axis, said rotor including an armature core and a plurality of windings wound around said armature core, said permanent magnets each having an axial length dimension at the center thereof in the direction of the central axis of rotation, the axial length dimension in the direction of the central axis being a maximum at the center of each permanent magnet and being progressively reduced toward both side ends of each permanent magnet.

7. The electric rotary device of claim 6, wherein said axial length dimension is progressively reduced in a linear manner from a maximum at the center of each permanent magnet to a minimum at each side end thereof.

8. The electric rotary device of claim 6, wherein said axial length dimension is progressively reduced in a non-linear manner from a maximum at the center of each permanent magnet to a minimum at each side end thereof.

* * * * *